(12) United States Patent
Satya Sudhakar (10) Patent No.: US 8,095,509 B2
(45) Date of Patent: Jan. 10, 2012

(54) TECHNIQUES FOR RETAINING SECURITY RESTRICTIONS WITH FILE VERSIONING

(75) Inventor: Gosukonda Naga Venkata Satya Sudhakar, Bangalore (IN)

(73) Assignee: Novell, Inc., Provo, UT (US)

( * ) Notice: Subject to any disclaimer, the term of this patent is extended or adjusted under 35 U.S.C. 154(b) by 367 days.

(21) Appl. No.: 12/025,977

(22) Filed: Feb. 5, 2008

(65) Prior Publication Data

US 2009/0043774 A1    Feb. 12, 2009

(30) Foreign Application Priority Data

Nov. 8, 2007    (IN) .......................... 2343/DEL/2007

(51) Int. Cl.
 *G06F 17/30* (2006.01)
(52) U.S. Cl. ..................................... 707/638
(58) Field of Classification Search .................. 707/638
 See application file for complete search history.

(56) References Cited

U.S. PATENT DOCUMENTS

| | | | | |
|---|---|---|---|---|
| 4,827,462 A * | 5/1989 | Flannagan et al. | ......... | 369/30.09 |
| 5,301,286 A * | 4/1994 | Rajani | .......................... | 711/202 |
| 5,592,511 A * | 1/1997 | Schoen et al. | ............... | 375/220 |
| 5,761,677 A * | 6/1998 | Senator et al. | ........................ | 1/1 |
| 6,151,643 A * | 11/2000 | Cheng et al. | ..................... | 710/36 |
| 6,185,584 B1 | 2/2001 | Paik | | |
| 6,212,512 B1 * | 4/2001 | Barney et al. | ......................... | 1/1 |
| 6,269,431 B1 * | 7/2001 | Dunham | ....................... | 711/162 |
| 6,324,581 B1 * | 11/2001 | Xu et al. | ........................ | 709/229 |
| 6,366,930 B1 * | 4/2002 | Parker et al. | ........................... | 1/1 |
| 6,430,455 B1 * | 8/2002 | Rebello et al. | ................ | 700/105 |
| 6,430,608 B1 * | 8/2002 | Shaio | ............................ | 709/217 |
| 6,510,552 B1 | 1/2003 | Benayoun et al. | | |
| 6,766,334 B1 * | 7/2004 | Kaler et al. | ........................... | 1/1 |
| 6,823,348 B2 | 11/2004 | Benayoun et al. | | |
| 7,093,099 B2 * | 8/2006 | Bodas et al. | .................... | 711/206 |
| 7,386,546 B1 * | 6/2008 | Santry et al. | .......................... | 1/1 |
| 2001/0037323 A1 * | 11/2001 | Moulton et al. | ................... | 707/1 |
| 2002/0065835 A1 * | 5/2002 | Fujisaki | ....................... | 707/200 |
| 2003/0074376 A1 | 4/2003 | Benayoun et al. | | |
| 2005/0065986 A1 | 3/2005 | Bixby et al. | | |
| 2006/0101092 A1 | 5/2006 | Ishida et al. | | |
| 2006/0288056 A1 | 12/2006 | Yamakawa et al. | | |

OTHER PUBLICATIONS

Pool, xdiff, Jun. 24, 2004 (accessed Apr. 1, 2010 at http://web.archive.org/web/20040624154223/http://librsync.sourcefrog.net/doc/rdiff.html).*

* cited by examiner

*Primary Examiner* — James Trujillo
*Assistant Examiner* — William Spieler
(74) *Attorney, Agent, or Firm* — Schwegman, Lundberg & Woessner, P.A.

(57) ABSTRACT

Techniques are presented for retaining security restrictions with file versioning. Files are versioned in such a manner that metadata including full directory paths and access restrictions are retained for each version of the file and enforced when each version is accessed. The files are versioned to hashed subdirectories for space and management efficiencies. In an embodiment, prior versions of a particular file are maintained as delta data structures while a most-recent version of that file is maintained in its full or complete data state.

11 Claims, 4 Drawing Sheets

TECHNIQUES FOR RETAINING SECURITY RESTRICTIONS WITH FILE VERSIONING

RELATED APPLICATIONS

This application claims the benefit of priority to India Patent Application No. 2343/DEL/2007 filed in the India Patent Office on Nov. 8, 2007 and entitled "TECHNIQUES FOR RETAINING SECURITY RESTRICTIONS WITH FILE VERSIONING;" the disclosure of which is incorporated by reference herein.

BACKGROUND

Data and information are rapidly becoming the life blood of enterprises. Transactions with customers, operational data, financial data, corporate intelligence data; in fact, all types of information are now captured, indexed, stored, and mined by enterprises in today's highly competitive and world economy.

Since information is vital to the enterprise, it is often made available twenty-four hours a day, seven days a week, and three hundred sixty-five days a year. To this, the enterprises have to implement a variety of data replication, data backup, and data versioning techniques against their data models or their data warehouses.

For example, an enterprise may periodically capture the state of its data for a particular volume as a snapshot. If something should happen to the volume, it can be completely restored to the saved snapshot state. Another technique mirrors a volume on multiple volumes, such that if one volume is down or not accessible, another volume is automatically made available unbeknownst to the users. This is often referred to as data replication or failover support.

In still more cases, an enterprise may desire to permit different versions of files in the data warehouse to be captured, archived, and restored on demand by a user. This may be useful for a variety of reasons. For example, a user may download a file and work with it offline and could then lose the file due to a hardware failure. In another case, a user may make changes to a file and then determine that a previous version was more acceptable or more desirable. In either case, if the files are versioned, the user can retrieve a desired version of a file from an archive or versioning volume.

Versioning or archive services typically store an entire file, even if only a single byte of information changes between different versions of that file. Some techniques use a file difference technique to flag different versions. In a file difference approach, the original and first file version is maintained as a base and difference files are produced to represent the subsequent versions. Many times in versioning the two types of versioning mentioned above, one user may have access rights to a particular version and not other versions.

Yet, current techniques typically have no ability to retain security restrictions from version to version. Moreover, conventional versioning methods often lose a version's original directory path information; such that when a version is recovered a user may not be able to ascertain where that version was originally located in a directory. Loss of directory path information is often intentionally done to avoid conflicts/collisions and to avoid too many directories or directory entries appearing on a given file system, which may have hard limitations in that regard.

Thus, there is a need for improved techniques in retaining security restrictions with file versioning.

SUMMARY

In various embodiments, techniques are provided for retaining access restrictions with file versioning. More particularly and in an embodiment, a method is provided for versioning files. An event is detected that indicates a file is to be versioned. Next, a directory path for the file, in its native location and where it is to be versioned from is acquired and metadata associated with the directory path is also acquired. The metadata includes access permissions on the file. The directory path is prefixed with a root path on an archive volume, which is where the file is to be archived in order to create a full path. The full path includes the root path, the directory path, and a file name for the file. Furthermore, the full path is hashed to acquire a hashed string and the hashed string is indexed to a particular subdirectory on the archive volume. The subdirectory is used to store the metadata and the file as a new version of the file; and when the new version is accessed from the particular subdirectory, the access permissions in the metadata are enforced against requesters.

DETAILED DESCRIPTION

A "client" refers to a device or an environment of an end-user or an automated application of an end user. In some cases, the client may be viewed as a user's workstation machine that the user accesses to interact on a network, such as a wide-area network (WAN, e.g., Internet) or local-area network (LAN). The client is where the user or an automated service or application of the user edits and saves files. The client includes a "client agent" that executes on the client and allows the user to see all the archived versioned files and selectively retrieve particular ones of those files on demand.

A "host server" is where files that the user access are stored and accessed from the client over a network connection (WAN or LAN). The host server includes a "server agent." The server agent executes on the host server for purposes of interacting with the client agent and services of the archive-versioning server.

An "archive-versioning server" is where versions of the files stored on the host server are housed and where archive-versioning services execute. The archive-versioning service also includes an agent that interacts with the server agent of the host server.

An "archive-volume" is where the archived files are actually archived.

In various embodiments discussed herein and below, the services and methods defined may be implemented in whole or in part as the client agent, the host server agent, and/or the archive-versioning agent.

Initially, an administrator configures a time interval (T), such that there is an epoch every T period of time. Every epoch triggers file versioning. Moreover, at any point in time a maximum number of versions (N) for the files are maintained for any given T. Both T and N are configurable and can be dynamically changed by an administrator with proper access privileges to do this.

A "full file" is a file that includes all of its data bytes and does not include any delta changes or other instructions that are used to reconstruct the file from another file. In other words, a full file does not need reconstructed; it is fully and completely represented with its data bytes.

A "delta" refers to one or more differences that are recorded in a normalized format to represent the reverse progression of a full file from its latest and more recent version to a prior version. So, a delta is a data structure or type of file that includes information and instructions that can be applied to a full file to obtain a prior version of that full file. If there are 3 files that were created serially in time as A, B, and C; then C is the full file and B and A can be represented using delta data structures D1 and D2. When D1 is applied to C, file B is obtained and when D2 is applied to file B, file C is obtained. Conventional delta approaches do not operate in this manner, they make the full file as the first and initial version of the file, which would be A in our example and then deltas are serially applied to reach finally the latest version of C.

Moreover, the deltas include only deleted data from the subsequent version that is needed to obtain the proper file for the version that the delta represents. So, if there are 2 file versions: A and B; and B includes data strings X and Y whereas A includes data strings X and Z; the delta D that represents A includes Z but not Y; rather D identifies where Y appears in B (where Y starts and for defined byte length in B or where Y starts and ends in B) but not the data associated with Y. In this manner, a user that has access to just A and not B can see D and a reproduction of A as X and Y but will not be able to see Z, if the user lacks access rights to B. This will be discussed in greater detail herein and below.

Therefore, the delta file versioning approach taken herein and below is in fact the opposite of that which is currently used in conventional delta-based file versioning approaches.

According to an embodiment, the techniques presented herein may be implemented within Novell products distributed by Novell, Inc. of Provo, Utah. Of course it is to be understood that any network architecture, device, proxy, operating system (OS), or product may be enhanced to utilize and deploy the techniques presented herein and below.

It is within this initial context that various detailed embodiments of the invention are discussed.

Figure 1:
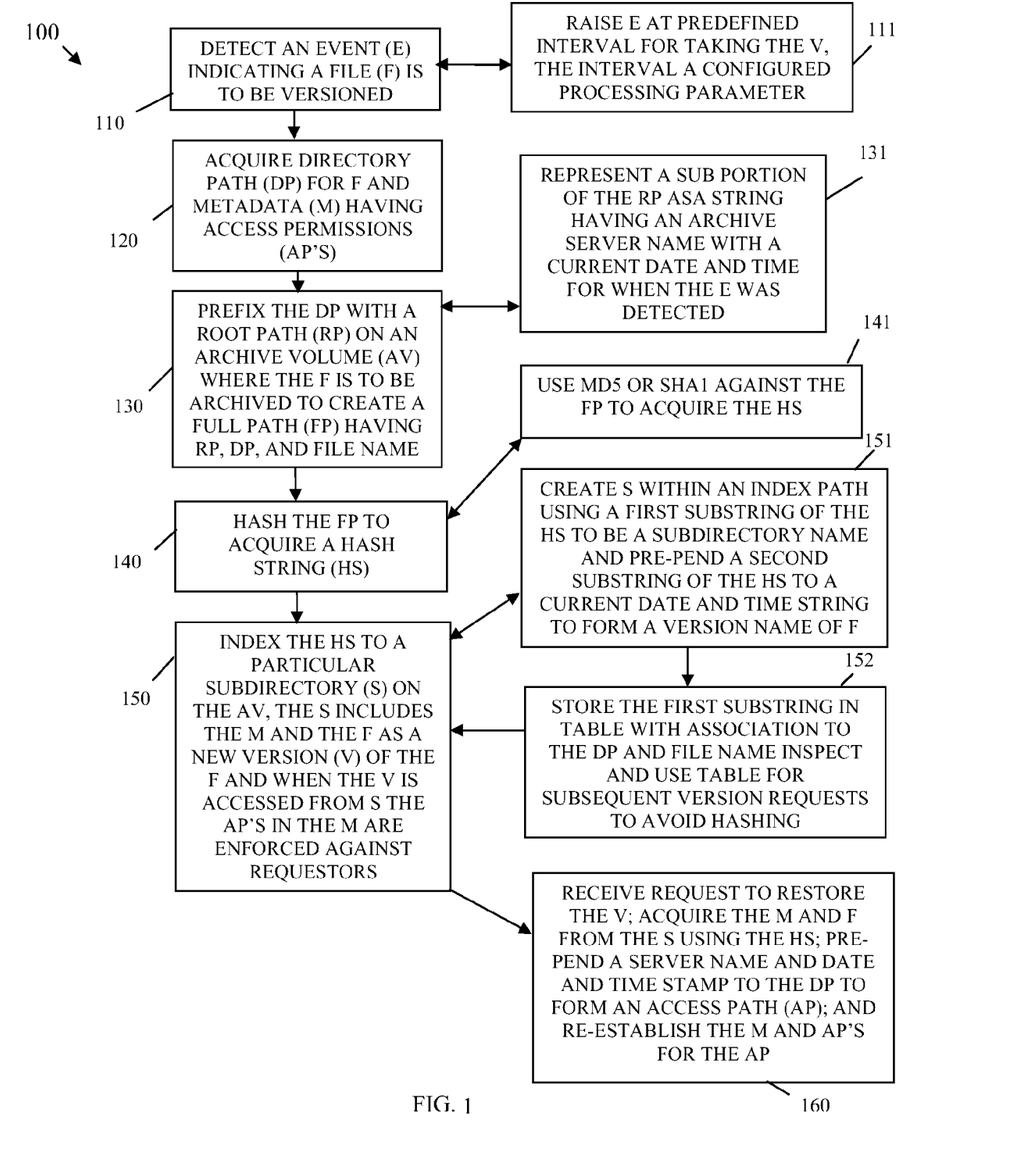
FIG. 1 is a diagram of a method for versioning files, according to an example embodiment.

FIG. 1 is a diagram of a method 100 for versioning files, according to an example embodiment. The method 100 (hereinafter "versioning service") is implemented as instructions within a machine-accessible and computer-readable medium that when processed by a machine (computer or processing device) performs the processing detailed in the FIG. 1. The versioning service is also accessible over a network (WAN or LAN). The network may be wired, wireless, or a combination of wired and wireless.

The versioning service may be implemented on a host or archive-versioning server as one or more host server agents and/or as one or more archive-versioning server agents that interact with a client of a user or an automated application of the client. Again, the users operate off of clients (workstations) networked to the servers (host and archive-versioning) in a client-server architecture.

At 110, the versioning service detects an event that a file is to be versioned. Detection of the event may occur in a variety of manners.

For example, at 111, the versioning service itself may raise the event at a predefined interval for taking the new version of the file. The predefined interval can be a configured processing parameter associated with the versioning service. Additionally, a profile or a dynamically submitted parameter may be used to define the interval. The point is that the interval within which the event is raised to version the file can be determined dynamically or in a predefined manner and it can be changed.

In other cases, the user may specifically make the request to version the file or an automated application makes the request to version the file; in such a case the request is detected as the event. Furthermore, dynamic policy evaluation may lead to raising the event.

At 120, the versioning service acquires a directory path for the file that is to be versioned and metadata associated with the directory and the file. The metadata may include such information as date last modified, identity of the resource or user that last modified the file, identity of the owner of the file, etc. Specifically, the metadata includes access permissions for one or more users or groups of users.

It is noted that as used herein a resource includes a user, groups of users, an automated application, or a class of automated applications. Thus, the permissions on the file or directory defined within the metadata can be for any resource capable of accessing the file.

At 130, the versioning service prefixes the directory path with a root path for where the file is to be versioned within a directory tree of an archive volume. The combination of the prefixed root path and the directory path define where on the archive volume the versioned file it to be placed or located. This creates a full path that includes the root path plus the directory path and finally a name for the file being versioned.

According to an embodiment, at 131, the versioning service represents a sub portion of the root path as a string that includes the archive server name along with a current date and time for when the event was detected.

An example illustration as to how the full path is constructed along with other aspects of the processing associated with the versioning service is described later with respect to the FIG. 1.

At 140, the versioning service hashes the full path to acquire a hash string.

According to an embodiment, at 141, the versioning service uses a message-digest algorithm (MD5) or a secure hash algorithm (SHA1). Although, it is to be understood any hash algorithm may be used of any length.

At 150, the versioning service indexes the hash string to a particular subdirectory on the archive volume. The subdirectory includes the metadata and the file being archived. Moreover, whenever the file is accessed from the subdirectory the access permissions from are enforced against the requesting resources.

In an embodiment, at 151, the versioning service creates within the subdirectory an index path using a first substring of the hash string as the subdirectory name. Moreover, a second remaining substring of the hash string is pre-pended to a current date and time string to form a version name for the file being versioned.

In some cases, at 152, the versioning service stores the first substring in a table or file along with the association that it has to the directory path and the file name. The versioning service may subsequently inspect and use the table or file as a lookup the next time the file is to be versioned. This ensures that the hashing for the file does not have to be processed on subsequent iterations where the file is being versioned. This saves processing cycles and improves throughput of the archive versioning server.

According to an embodiment, at 160, a request is received from a client to restore the version of the file that was archived. In response, the metadata and the file is acquired from the subdirectory using the hash string. A server name where the file is versioned is pre-pended along with the data and time stamp to the directory path to form a requesting resource access path for acquiring the versioned file. Next, the metadata along with the access permissions are re-established for the access path and enforced against the requesting resource that is attempting to acquire the versioned file.

The processing discussed for FIG. 1 is now discussed in detail within the context of specific example for purposes of illustration and comprehension.

Consider that at every epoch the versioning service backs up the files of particular directories, file system, or volume by setting a modified time filter and a file pattern filter to be versioned. Instead of writing data to tape, the data is sent to restore Application Programming Interfaces (APIs). So, the data from a read dataset operation on a particular file on an origin volume is sent to a write dataset operation (SMS APIs or equivalent) on the versioning server's volume where the versioned files are stored.

So, if there are files like this on server server1:
/home/sd/a.doc
/home/sd/Desktop/b.doc
then after the job (started, say, at 02:10 PM on 14/06/07 (Jun. 14, 2007) is over the files are available on a versioning server like this:
/versions/server1_0706141410/home/sd/a.doc
/versions/server1_0706141410/home/sd/Desktop/b.doc After the copy is done then each file with its full path and server name will hashed using MD5 or SHA1 kind of algorithms. In the example for a.doc and b.doc the following strings are used as input to the hash algorithm:
server1/home/sd/a.doc
server1/home/sd/Desktop/b.doc
So,
SHA1(server1/home/sd/a.doc)=98AB5434DACBD
SHA1(server1/home/sd/Desktop/b.doc)=
1A8D873123CBD (Here the file length is only indicative and not exactly the size of SHA1 hash)

Now, an indexing directory is taken and the two files with the SHA1 output are created with a time at which they were versioned. To avoid too many files in one directory, the first 4 characters of file are used as a subdirectory. Thus, the following files for a.doc and b.doc (0706141410 is the time at which versioning took place) are acquired:
/ versions / index / 98AB / 5434DACBD_0706141410
/ versions / index / 1A8D / 873123CBD_0706141410

The client on a user's Desktop mounts the /versions by standard file access protocols. If a file's versions are to be retrieved then SHA1 hash on the file is obtained and in /versions/index the file is looked at and the times at which the versions are retrieved is obtained and displayed to the user. If the user wants to retrieve that file then the particular time stamp is appended to the server name and the file is retrieved.

As an example if user wants to restore a version of /home/sd/a.doc then SHA1 hash of this string is taken and all the files that start with 5434DACBD in the directory 98AB are taken and the timestamps appended to these files are taken and displayed to the user. For example, if the timestamp is 0706141410 then it is appended to server name in order to get server1_0706141410. Now, this is appended to /versions. The result is /versions/server1_0706141410. The actual file path is appended to it. This results in /versions/server1_0706141410/home/sd/a.doc. Thus the required file is retrieved.

Other features may be used to enhance the usage of the hashing and indexing of the directory paths and file names. For example, instead of storing each hash as a file, which consumes inodes and wastes disk space, all hashes starting with, say, 8AB46 in a file with the name of the file as 8AB46_<timestamp> where timestamp is the last modified time stamp of the file. At most and at any time there are two such files starting with the name 8AB46_. When the third file is going to be created, say, after third epoch from the time the first 8AB46_file is modified, the first 8AB46_file is deleted. Clients use the latest of the files available always. If a client opens a latest file and another file (is latest now) gets created then the client using the older file will read it and close. Next time when the client reads, the client reads the latest one. The old file will be deleted when next latest file will be created i.e., after an interval of an epoch. To make it clear consider an example: at T0, 8AB46_T0 gets created. A client C1 uses 8AB46_T0 and reads the required hashes and closes it. If a file 8AB46_T1 is created meanwhile, any client say C2 uses this file after T1 though 8AB46_T0 is available. Any clients using 8AB46_T0 will use it for few seconds and close. So after, say, 1 minute after 8AB46_T1 is created there will be no client using 8AB46_T0. So, this file can be safely deleted before creating 8AB46_T2. To avoid clients reading latest file while reading, it will be created with 8AB46 name and will be later rename to 8AB46_<timestamp>.

The hashes can also be sorted. So, the contents of the file, say, 8AB46_T1 that includes hashes is always sorted. Thus, clients can do a binary search on the file and get the required hashes more expeditiously.

Figure 2:
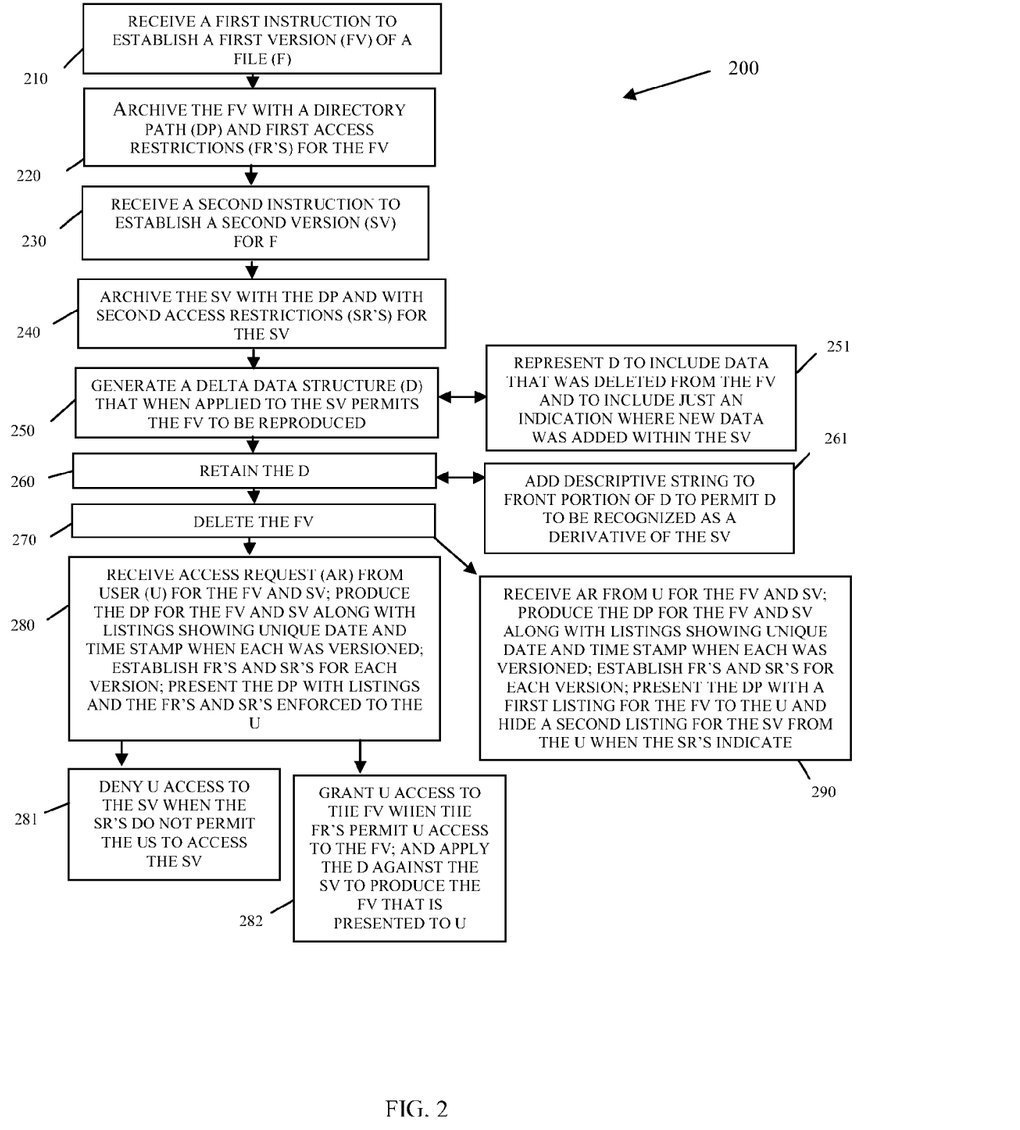
FIG. 2 is a diagram of a method for versioning files, according to an example embodiment.

FIG. 2 is a diagram of another method for versioning files, according to an example embodiment. The method 200 (hereinafter "archive-versioning service") is implemented in a machine-accessible and computer-readable medium as instructions. The instructions when executed by a machine (computer or processing device) performs the processing depicted in the FIG. 2. The archive-versioning service also accessible over a network that is wired, wireless, or a combination of wired and wireless. The archive-versioning service presents an alternative perspective to the versioning service represented by the method 100 of the FIG. 1 and in some cases an enhanced perspective.

At 210, the archive-versioning service receives a first instruction to establish a first version of a particular file. Again, the first instruction may be configured and may be a raised event that occurs at a predefined interval or epoch.

Additionally, it is to be understood that although the embodiments describe versioning a single file that in fact an entire directory, set of directories, file system, or volume and their files may be processed. A single file's processing is discussed for ease of comprehension only.

At 220, the archive-versioning service archives the first version with its native directory path and its native access restrictions or security restrictions for access limitations that are enforced against requesting resources that attempt to access the first version.

At 230, the archive-versioning service subsequently receives a second instruction to establish a second version for the file. This may occur at the next epoch or interval.

At 240, the archive-versioning service archives the second version with the directory path and with second access restrictions that are associated with the second version.

At this point in time, at least two versions of the file are versioned or stored in the versioning repository. The technique for where and how these files are stored on the archive volume or repository was discussed in detail above with reference to the method 100 of the FIG. 1.

At 250, the archive-versioning service generates a delta data structure that when applied to the second version permits the first version to be reproduced. Conventionally, delta or difference-based file versioning was achieved by creating deltas for the most-recent or latest version of a file. It is the exact opposite with the embodiments discussed herein in that the delta data structure is produced for the prior versions of the file and not the most-recent or latest version of the file. So, the delta data structure represents the first version of the file and not the second version of the file.

The second version of the file is a full file. In other words, the second version of the file includes all the data bytes that it should and does not have to be reconstructed to be rendered to a requesting resource.

In an embodiment, at 251, the archive-versioning service represents the delta data structure so as to include deleted data that was deleted from the first version when the first version transitioned to the second version of the file. This can be achieved by comparing the first and second versions with one another in an automated fashion using any file compare utility. The deleted data is retained in the delta data structure. Additionally, any new data that was added between the first version and the second version is not represented in the delta data structure. This improves security, since if a resource (user) has access to or can view the delta data structure that user will not be capable of seeing data added to the second version. The delta data structure rather includes an indication as to where the data was inserted in the second data structure and for how long or where it ends. Thus, there is no security loophole with this delta-based approach. An example, of how this may work was presented above before the discussion of the FIG. 1.

At 260, the archive-versioning service retains the delta data structure. In an embodiment, at 261, a descriptive string is added to the front portion of the delta data structure to permit the delta data structure to be recognized as a derivative of the second version.

At 270, the archive-versioning service then deletes the first version of the file from the archive volume. At this point in time, the second version is a full file and represents the latest or most-recently acquired version for the file being versioned and the first version is represented as the delta data structure.

According to an embodiment, at 280, the archive-versioning service receives an access request from a user for the first version and the second version. In response, the archive-versioning service produces the directory path for the first version and the second version along with listings showing unique date and time stamps for when each was versioned. Next, the archive-versioning service establishes the first access restrictions and the second access restrictions for each version. It is noted that the first access restrictions may be different for different users than that which is associated with the second access restrictions. Finally, the directory path along with the listings are presented to the user for access and the first and second access restrictions are enforced against the user.

In a particular case, at 281, the archive-versioning service denies the user access to the second version when the second access restrictions do not permit and when the user attempts to access the second version of the file.

In another case, at 282, the archive-versioning service grants the user access to the first version when the first access restrictions permit the user to access the first version. When this is the case, the archive-versioning service applies the delta data structure against the second version of the file to produce the first version or derive it using the full file representing the second version and the instructions represented in the delta data structure. The reconstructed and produced first version of the file is then presented to the user for access.

In still another case, at 290, the archive-versioning service receives an access request from a user for the first version and the second version similar to the processing discussed at 280. Again, the directory path for the first version and the second version is produced along with listings showing a unique date and time stamp when each version was versioned. Next, the first access restrictions and the second access restrictions are established. However, in this scenario the second access permissions may dictate that the second version is not to be seen or be visible to the user at all. So, a first listing for the first version is presented to the user and the first access restrictions are enforced when the user attempts to access the first version. The first version is reconstructed in the manner discussed above at 282. The listing for the second version is hidden and not displayable to or not viewable by the user.

So, the processing discussed at 290 permits visibility features to be implemented, such as that which is present with the NSS file system. Thus, the access restrictions can include a visibility attribute.

Figure 3:
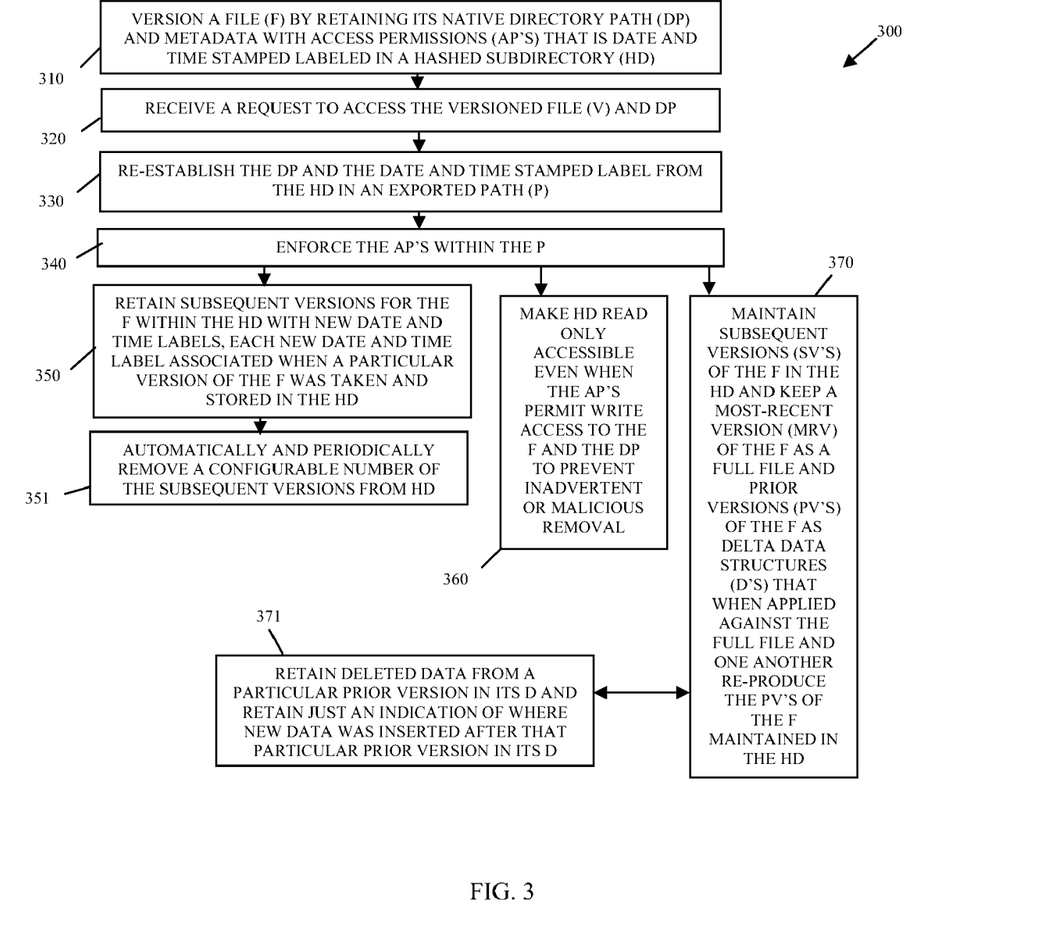
FIG. 3 is a diagram of a still another method for versioning files, according to an example embodiment.

FIG. 3 is a diagram of a still another method 300 for versioning files, according to an example embodiment. The method 200 (hereinafter "versioning security service") is implemented in a machine-accessible and computer-readable medium as instructions. The instructions when executed by a machine (computer or processing device) performs the processing depicted in the FIG. 3. The versioning security service is also accessible over a network that is wired, wireless, or a combination of wired and wireless. The versioning security service presents an alternative perspective and in some cases an enhanced perspective to the methods 100 and 200 of the FIGS. 1 and 2, respectively.

At 310, the versioning security service versions a file by retaining its native directory path and metadata. The metadata includes access permissions. The directory path and file name is hashed to a subdirectory and date and time stamped and labeled. Detailed examples of how this is achieved and how this is constructed was described in detail above with reference to the method 100 of the FIG. 1.

At 320, the versioning security service receives a request to access the versioned file and its directory path.

At 330, the versioning security service re-establishes the directory path and the date and time stamped label from the hash directory and provides it as an exported path that the requesting resource (user or automated application) can gain access to the file and versions of the file.

Next, at 340, the versioning security service enforces the access permissions within the exported path, such that the requesting resource is constrained by the security limitations defined in the access permissions for the version that the requesting resource desires.

According to an embodiment, at 350, the versioning security service retains subsequent versions for the file within the hash directory with new date and time stamped labels. Each new date and time label is associated with its particular version when a particular version for the file is taken and stored in the hashed directory. Again, the hashed directory may also be indexed. Examples of hashing and indexing to efficiently store versioned files and retrieve them were described in detail with reference to the method 100 of the FIG. 1.

In a particular situation, at 351, the versioning security service may also perform automatic and periodic removal of some versions of the file. That is, a configurable number of a desired amount of versions that are to be retained can be used to remove earlier versions of the file and to keep the hash directory at the desired number of versions for the file.

According to an embodiment, at 360, the versioning security service makes the hash directory read only accessible even when the access permissions grant write access to a resource for the file. This prevents inadvertent and/or malicious removal of archived versions of the file. So, as an example if a user is permitted to mount the hash directory then the user could delete some of the versions that he/she has access to. However, other users that are sharing the file may not be able to restore the versions that the user deleted. This scenario could also be used by the user as an attack on the archive volume. So, the hash directory is read only snapshotted after each version job and the snapshot is exported for purposes of being mounted. When a next version job is done, the snapshot can be resynchronized. (called a reset in EVMS terms).

In an embodiment, at 370, the versioning security service maintains subsequent versions for the file in the hashed directory and keeps the most-recent or latest acquired version as a full file. Each prior version retained in the hashed directory is represented as a delta data structure that when applied to the most-recent and full file version and any of the other delta data structures produces a desired and particular version of the file that is being requested. So, if there are three versions of the file A, B, C that were created serially in time beginning at time t0 with A; t1 with B; and t2 with C, such that t0>t1>t2 and that are present in the hashed directory; A is represented by a delta data structure d2 and B is represented by a delta data structure d1 and C is represented by a full file and not by any delta. To acquire B, the delta d1 is applied to C and to acquire A the delta d1 is applied to C and then the delta d2 is applied to get A.

At 371, the versioning security service retains in each delta deleted data that was present in the version to which the delta relates and that was removed in a subsequent version. However, data added from a particular version that the delta is related to a subsequent version is not present in the delta. This provides added security.

Example management and usage of the delta data structures were presented above with reference to the method 200 of the FIG. 2.

Figure 4:
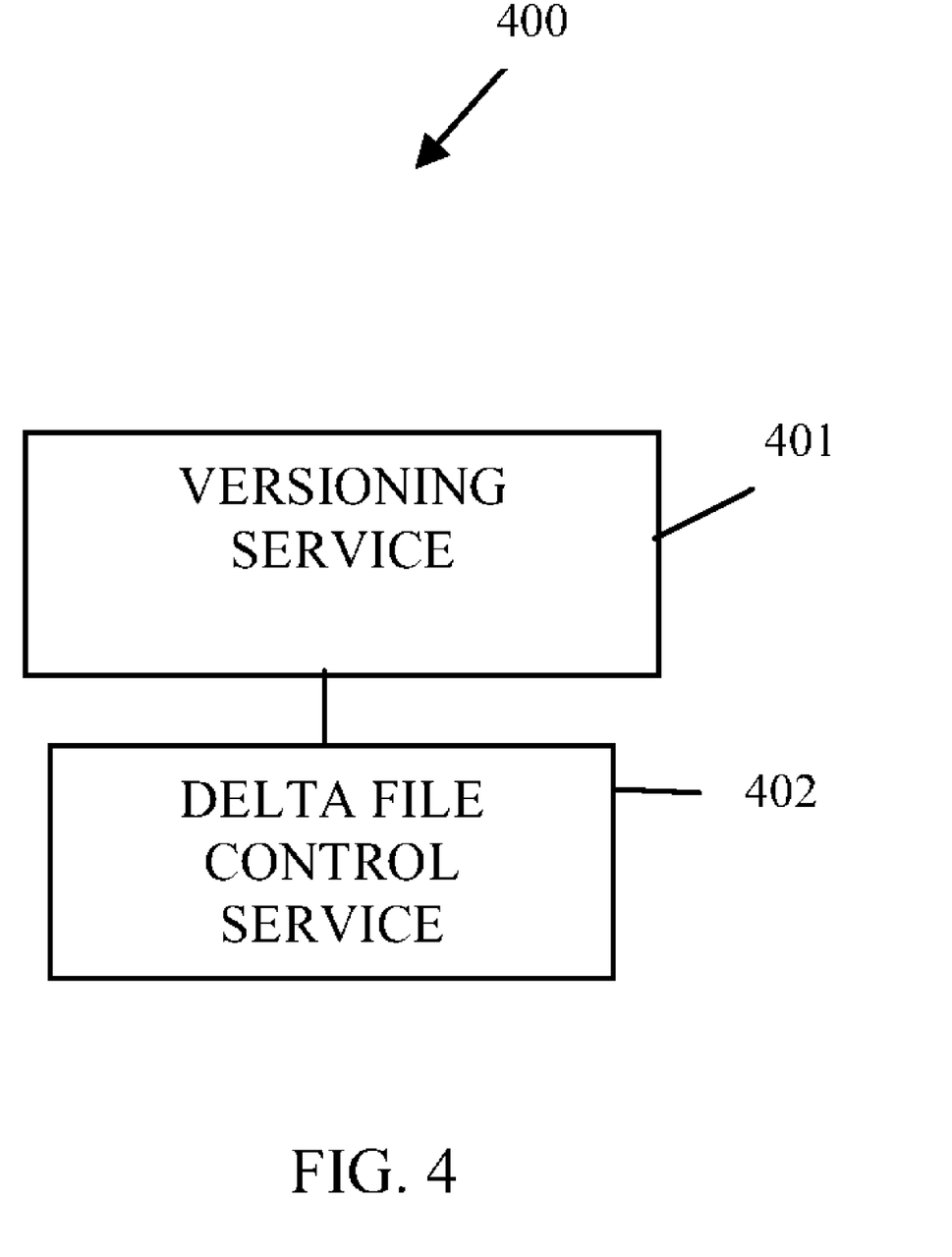
FIG. 4 is a diagram of a file versioning system, according to an example embodiment.

FIG. 4 is a diagram of a file versioning system 400, according to an example embodiment. The file versioning system 400 is implemented in a machine-accessible and computer-readable medium is accessible over a network. The network may be wired, wireless, or a combination of wired and wireless. In an embodiment, the file versioning system 400 implements various aspects associated with the methods 100, 200, and 300 of the FIGS. 1-3, respectively.

The file versioning system 400 includes a versioning service 401 and delta file control service 402. Each of these and their interactions with one another will now be discussed in turn.

The versioning service 401 is implemented in a machine-accessible and computer-readable medium. Example processing associated with the versioning service 401 was presented in detail above with reference to the methods 100 and 300 of the FIGS. 1 and 3, respectively.

The versioning service 401 versions files by retaining native directory paths for those file and retaining native metadata for those files and directory information associated with directory paths for the files. The metadata includes access restrictions for accessing the files and/or the directories within which the files natively reside before being versioned. Conventionally because of conflicts and other space and efficiency reasons the metadata and access permission were not properly retained with versioned files. The teachings presented herein retain this information as discussed at length herein and above.

According to an embodiment, the versioning service 401 houses the files, their native directory paths, and their native metadata in hashed subdirectories on an archive volume. The hash occurs in response to names associated with the files and their native directory paths and in some instances data and time stamps. Again, the details of this construction of the hashed and in some cases also indexed subdirectories were presented above in detail along with an example with respect to the method 100 of the FIG. 1.

In an embodiment, the versioning service 401 also is used to reconstruct the names and native directory paths along with the date and time stamps discussed above when a request for access is processed.

The delta file control service 402 is implemented in a machine-accessible and computer-readable medium as instructions and is to process on the server machine and one or more additional machines of the network. Example processing associated with the delta file control service 402 was discussed in detail above with reference to the method 200 of the FIG. 2.

The delta file control service 402 is to retain as a full file just a most-resent version of any particular file and is to manage prior versions of that full file as delta data structures that when applied to the full file produces a particular prior version. Each particular version of a particular file includes its own unique access restrictions that is enforced when an access attempt is made.

In other words, the access permissions for each version is kept with its delta data structure if that version is not the full file version or most-recent and last acquired version for the file.

According to an embodiment, the delta file control service 402 is periodically processed at configurable intervals.

In still another case, the versioning service 401 uses a restore application programming interface (API) to restore the files that represented backed up data and the files are restored with the natively recorded access restrictions before being restored for use by a client or user.

It is now understood how versioning can be achieved to retain access restrictions and how novel deltas may be used to provide optimal space and processing utilization.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method, comprising:
   receiving a first instruction to establish a first version of a file;
   archiving the first version along with a directory path and first access restrictions associated with the first version, wherein the directory path and the first access restrictions are native to the first version, the first version archived to an archive volume;

receiving a second instruction to establish a second version of the file;

archiving the second version of the file along with the directory path and second access restrictions associated with the second version, wherein the second version archived to the archive volume, and wherein the first version along with the first access restrictions are archived and the second version along with the second access restrictions are archived and then each version is indexed to a particular subdirectory within the archive volume by hashing full paths for each version including server name and directory name and a first portion of each version's file name is retained with an appended time stamp, the full paths hashed to multiple index files, each index file including a particular portion of hash values for the full paths;

generating a delta data structure that when applied to the second version permits the first version to be reproduced, the second version is a most recent version of the file whereas the first version is for a prior version of the file occurring before the most recent version of the file, the delta data structure applied to the most recent version to obtain the prior version, wherein the delta data structure records information and instructions in a normalized format that permits the prior version to be obtained from the most recent version;

retaining the delta data structure; and deleting the first version from the archive volume having the first version.

2. The method of claim 1 further comprising:

receiving an access request from a user for the file to access the first and second versions;

producing the directory path along with listings within the directory path for the first version and second version, each listing including unique date and time stamp for when that particular version was versioned;

establishing the first and second access restrictions for each of the versions; and presenting the directory path with the listings with the first and second access restrictions being enforced to the user.

3. The method of claim 2 further comprising, denying the user access to the second version when the second access restrictions do not permit the user to access the second version.

4. The method of claim 2 further comprising:

granting the user access to the first version when the first access restrictions permit the user to access the first version; and applying the delta data structure against the second version to produce the first version that is presented to the user for access.

5. The method of claim 1, wherein generating further includes representing the delta data structure to include data that was deleted from the first version when moving to the second version and to include just an indication of where new data was added in the second version from that which was originally in the first version without including the new data in the delta data structure.

6. The method of claim 1 further comprising, receiving an access request from a user for the file to access the first and second versions;

producing the directory path along with listings within the directory path for the first version and second version, each listing including unique date and time stamp for when that particular version was versioned;

establishing the first and second access restrictions for each of the versions; and presenting the directory path with a first listing for the first version to the user and hiding a second listing for the second version from the user when the second access restrictions indicate that the user is not to be able to see the second version.

7. The method of claim 1, wherein retaining further includes adding a descriptive string to a front portion of the delta data structure that permits the delta data structure to be recognized as a derivative of the second version that has to be applied to the second version to acquire the first version of the file.

8. A system, comprising:

a versioning service implemented in a computer-readable medium as instructions and to process on a server machine of a network; and a delta file control service implemented in a computer-readable medium as instructions and to process on the server machine and one or more additional machines of the network;

wherein the versioning service is to version files by retaining native directory paths for those files and retaining native metadata for those files and directories associated the directory paths, the metadata includes access restrictions for accessing the files and the directories, wherein the native metadata includes the access restrictions for accessing the files and the directories for the files as they natively existed before being versioned, and wherein the delta file control service is to retain as a full file, just a most-recent version of any particular file and manage prior versions of that full file as delta data structures that when applied to the most recent version produces a particular prior version, and wherein each particular version of a particular file includes its own unique access restrictions that is enforced when an access attempt is made, wherein the versioning service is to house the files along with their native metadata and their native directory paths in hashed subdirectories on an archive volume that are hashed in response to names associated with the files and the native directory paths and time stamps, the hashed subdirectories stored in multiple index files, each index file include a particular portion of hash values for the hashed subdirectories.

9. The system of claim 8, wherein the versioning service reconstructs the names and native directory paths along with date and time stamps when a request for access is processed.

10. The system of claim 8, wherein the delta file control service is periodically processed at configurable intervals.

11. The system of claim 8, wherein the versioning service uses a restore application programming interface to restore the files that represent backed up data and the access permissions associated with the files once restored.

* * * * *